United States Patent
Larsen

[19]
[11] Patent Number: 6,122,132
[45] Date of Patent: Sep. 19, 2000

[54] DISK DRIVE HEAD POSITION ENCODER

[75] Inventor: Raymond B. Larsen, Rawlins, Wyo.

[73] Assignee: Altra Corporation, Rawlins, Wyo.

[21] Appl. No.: 09/044,399

[22] Filed: Mar. 18, 1998

Related U.S. Application Data

[63] Continuation-in-part of application No. 08/949,750, Oct. 14, 1997, abandoned.
[60] Provisional application No. 60/040,838, Mar. 19, 1997.

[51] Int. Cl.[7] .................................................. G11B 5/596
[52] U.S. Cl. ...................................... 360/77.03; 360/78.11
[58] Field of Search .................... 360/77.03; 250/231.14, 250/231.18; 369/44.19

[56] References Cited

U.S. PATENT DOCUMENTS

| | | | |
|---|---|---|---|
| 3,784,833 | 1/1974 | Kimura | 250/237 G |
| 4,291,346 | 9/1981 | Beecroft et al. | 360/75 |
| 4,703,176 | 10/1987 | Hahn et al. | 250/231 |
| 4,782,327 | 11/1988 | Kley et al. | 340/365 |
| 4,935,728 | 6/1990 | Kley | 340/709 |
| 5,084,791 | 1/1992 | Thanos et al. | 360/77.04 |
| 5,091,808 | 2/1992 | Nigam | 360/78.05 |
| 5,119,259 | 6/1992 | Kikuchi | 360/135 |
| 5,179,482 | 1/1993 | Tanaka et al. | 360/97.01 |
| 5,227,625 | 7/1993 | Hetzler | 250/231.13 |
| 5,227,930 | 7/1993 | Thanos et al. | 360/78.04 |
| 5,245,597 | 9/1993 | Lee et al. | 369/44.28 |
| 5,305,159 | 4/1994 | Sakai et al. | 360/77.03 X |
| 5,396,477 | 3/1995 | Matsumoto et al. | 369/44.28 |
| 5,442,172 | 8/1995 | Chiang et al. | 250/237 |

OTHER PUBLICATIONS

Baumeister; Mark's Standard Hnbk for Mechanicl Engiineers; pp. 4–6 to 4–9, May 1974.
Condon; Handbook of Physics, 1967.

*Primary Examiner*—Paul Loomis
*Assistant Examiner*—Kin Wong
*Attorney, Agent, or Firm*—Flehr Hohbach Test Albritton & Herbert LLP

[57] ABSTRACT

A disk drive head position encoder is for use in a disk drive having a storage media, a read/write head and an actuator configured to control a position of the head. The position encoder includes a scale having gratings formed by undulations configured to distort light penetrating therethrough. A light source is configured to penetrate the scale and to direct light onto a photodetector, where the photodetector is configured to generate a photodetector signal in response to the light. A processor is coupled to the photodetector and the actuator and configured to determine a head position of the head on the storage media by processing the photodetector signal. In one embodiment, the is constructed from a material having a coefficient of thermal expansion similar to that of said storage media. In another embodiment, the processor includes an analog to digital convertor configured to convert the photodetector signal to a digital signal representative of an amplitude of the photodetector signal, and the processor is configured to determine the head position based at least in part on the digital signal. Advantages of the invention include the ability to accurately position the head on the storage media tracks during prolonged operation of the disk drive. As a result, the recording tracks on the storage media can be made very small and the head can be accurately placed on the recording tracks.

27 Claims, 4 Drawing Sheets

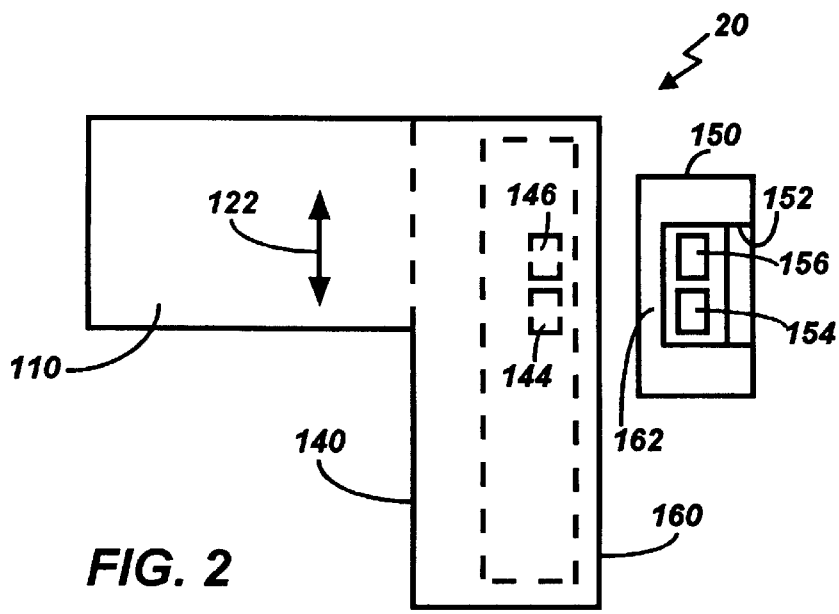
FIG. 2
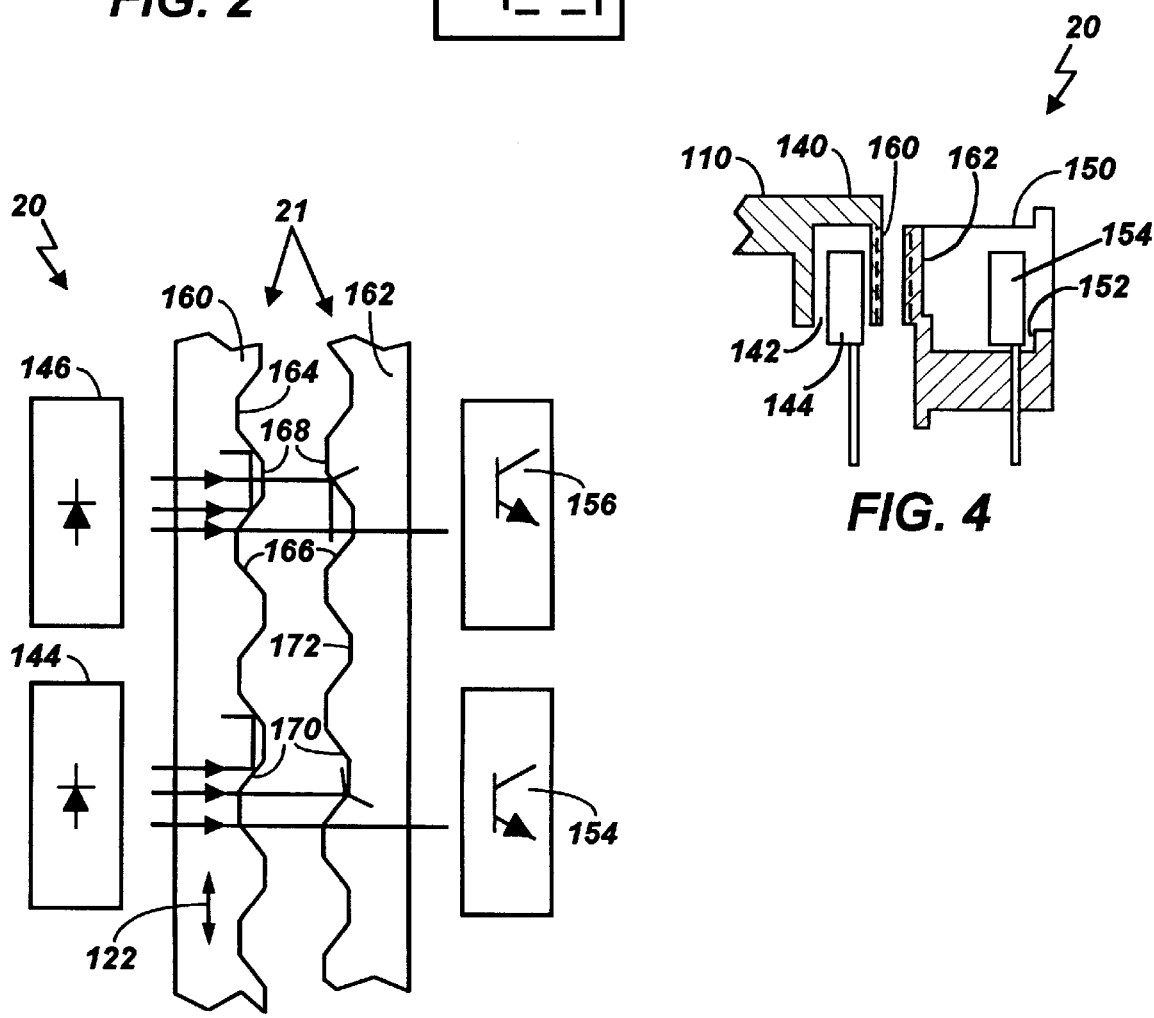
FIG. 3
FIG. 4

DISK DRIVE HEAD POSITION ENCODER

REFERENCE TO RELATED APPLICATIONS

This is a continuation-in-part of U.S. Ser. No. 08/949,750 filed Oct. 14, 1997 now abandoned, and claims priority to U.S. Provisional Appl. 60/040,838 filed Mar. 19, 1997. These applications are incorporated herein by reference.

FIELD

The invention relates to a disk drive head position encoder and particularly to an optical encoder that achieves a high degree of accuracy and that can compensate for expansion of the disk drive storage media.

BACKGROUND

A disk drive typically includes storage media, a read/write head and a head position encoder. The storage media is a platter that contains a large number of closely spaced concentric tracks. The head is positioned at a specific location over a track and instructed to read or write information on the media. In order to achieve high density storage, the tracks are located very close to one another and the placement of the head is very important. Head position encoders are known in the art and are roughly categorized into two types: electromechanical encoders and optical encoders. Electromechanical encoders generally sense current through magnetic coils to determine the head position. Optical encoders generally sense the application of light on a surface to determine the head position.

Known optical head position encoders are described in U.S. Pat. Nos. 4,703,176 and 5,084,791, incorporated herein by reference. The '176 patent describes a polyphase optical position encoder using a movable glass scale with alternating equally dimensioned opaque and translucent regions extending generally perpendicular to the locus of scale movement. A light source penetrates the scale and directs light onto a pair of photodetector areas symmetrically disposed about an axis of rotation of the disk drive head. The photodetectors are responsive to the light source and to the relative position of the scale. The photodetectors provide a quadrature-phase signal to a processor that is used to governs the movement of the head.

The '791 patent is similar to the '176 patent and includes a temperature detector. A processor is configured to determine the thermal expansion of the storage media based on a linear approximation and to adjust the head position based on the approximation of the thermal expansion. This technique is processor intensive and presumes that the thermal expansion is linear.

Accordingly, a limitation of existing disk drive head position encoders is that the temperature of the disk drive causes misalignment with the head and the recording tracks because of the thermal expansion of the storage media, and known compensation techniques for the expansion is performed by relatively complicated procedures of measuring the temperature and then estimating the position change. These compensation techniques also require additional hardware or firmware. Another limitation of existing disk drive head position encoders is that they determine position of the head based on a quadtrature-phase detection technique that does not provide a high degree accuracy.

What is needed is a disk drive head position encoder that is very accurate in position and that compensates for thermal expansion of the storage media in order to provide an accurate position of the head over the recording tracks of the storage media.

SUMMARY

In summary, the invention is a disk drive head position encoder that can employ a very accurate position technique and that can compensate for thermal expansion of the storage media. An embodiment is for use in a disk drive having a storage media, a read/write head and an actuator configured to control a position of the head. The position encoder includes a scale having gratings formed by undulations configured to distort light penetrating therethrough. A light source is configured to penetrate the scale and to direct light onto a photodetector, where the photodetector is configured to generate a photodetector signal in response to the light. A processor is coupled to the photodetector and the actuator and configured to determine a head position of the head on the storage media by processing the photodetector signal.

In one embodiment, the scale is constructed from a material having a coefficient of thermal expansion similar to that of the storage media.

In another embodiment, the processor includes an analog to digital convertor configured to convert the photodetector signal to a digital signal representative of an amplitude of the photodetector signal, and the processor is configured to determine the head position based at least in part on the digital signal.

Advantages of the invention include the ability to accurately position the head on the storage media tracks during prolonged operation of the disk drive. As a result, the recording tracks on the storage media can be made very small and the head can be accurately placed on the recording tracks.

DESCRIPTION OF THE FIGURES

Additional objects and features of the invention will be more readily apparent from the following detailed description and the pending claims when taken in conjunction with the drawings, in which:

FIG. 2 depicts a head position encoder according to an embodiment of the invention;

FIG. 3 is an exploded view of FIG. 2;

FIG. 4 is an exploded view of FIG. 2;

DETAILED DESCRIPTION

The invention is described with reference to specific configurations. Those skilled in the art will appreciate that various changes and modifications can be made to the exemplary embodiments while remaining within the scope of the present invention.

Figure 1:
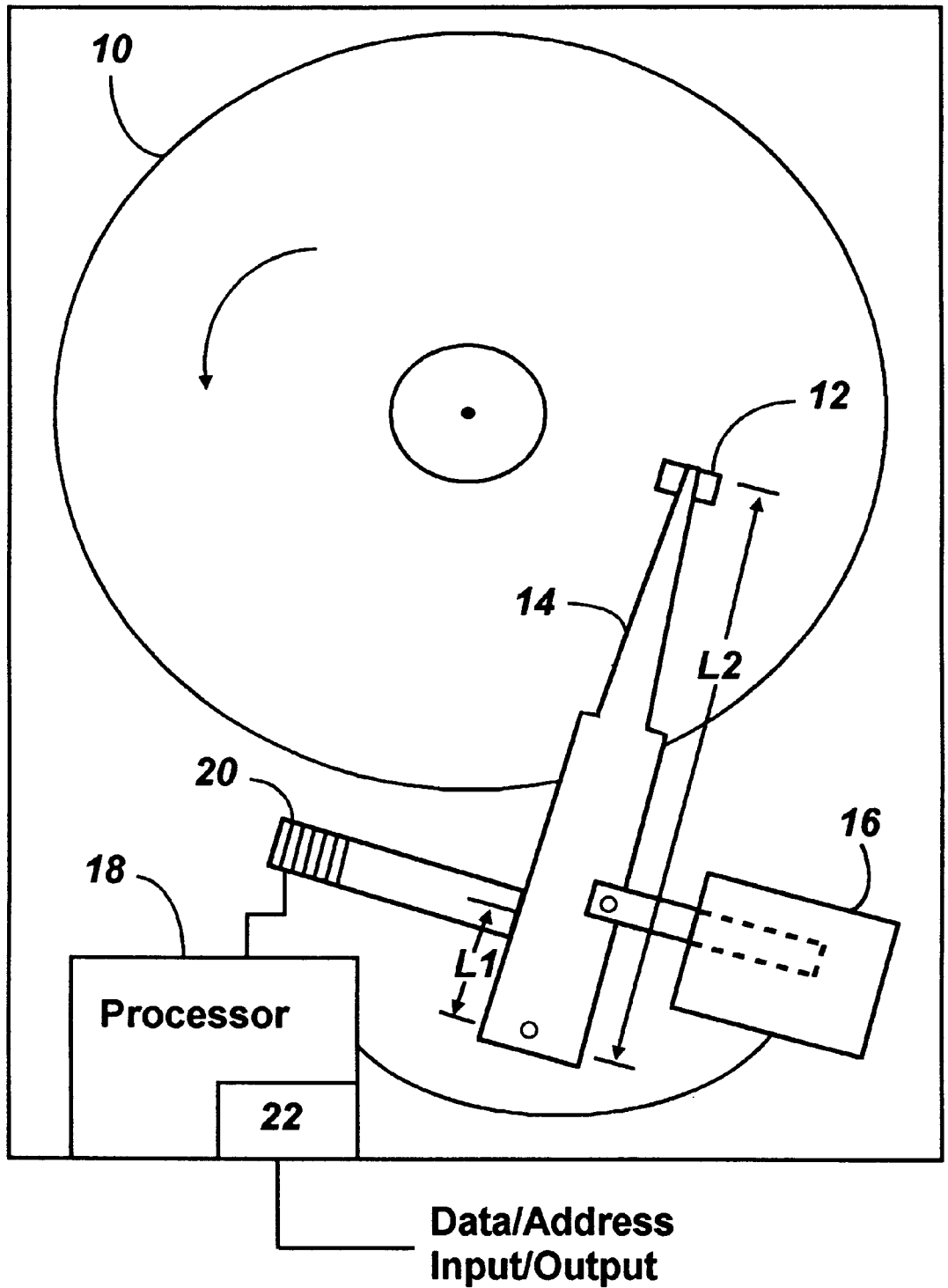
FIG. 1 depicts s disk drive showing the storage media, the head, the actuator, the processor and the head position encoder.

Referring to FIG. 1, a disk drive includes a storage media 10 in a circular shape. The storage media is spun the direction of the arrow by a spindle motor as known in the art. A read/write head 12 is supported by an arm 14 and positioned over the storage media. When the media is rotating, the head rides on an air layer just over the surface of the storage media. An actuator 16 is coupled to the arm and is configured to move the arm back and forth over the surface of the media. A processor 18 is coupled to the actuator and controls the actuator movement. A head position encoder 20 includes a scale 21 and is also coupled to the arm and is configured to provide a position signal to the processor. The disk drive is connected to a computer for receiving and providing data. The processor 18 communicates with the computer through an interface 22 instructing the processor 18 of the location and information to read or write on the media. The processor 18 uses the information from the position encoder 20 to control the actuator 16 in order to correctly position the head 12 over the desired location to in order read or write on the media.

Storage media is known in the art. For example, removable media used for floppy disk drives and Iomega's Zip type drive has a Mylar substrate (polyethylene tetraphthalate) with a ferro-magnetic coating. A known characteristic of Mylar is that it expands with increased temperature and/or moisture. Since the information tracks on the storage media are located very close to one another, a misalignment can cause the disk drive to miss the information and provide erroneous data. Known head position encoders use a glass scale that maintains substantially the same size over the operating temperature in the disk drive. In order to accurately track the disk, servo tracks are constructed on the media and the processor compensates for the temperature to adjust the head position as the temperature increases.

In one embodiment, the head position encoder uses a plastic scale in the position encoder that automatically compensates for the thermal and/or moisture expansion of the storage media. The scale material is selected to have a similar expansion coefficient as the Mylar storage media. When the Mylar expands and the radius of the information tracks increases, the scale likewise expands and compensates for the expansion of the tracks. For example, the thermal expansion coefficient is matched closely by the distances L1 and L2. To determine the desired thermal expansion coefficient of the scale, two steps are taken. The first is to determine the thermal expansion of the tracks (Mylar). If the thermal expansion coefficient of Mylar is $T_m$ (change in size per Celsius), then the tracks (at a radius R) will be displaced ($D_t$), according to Equation 1.

$$D_t = R * T_m \quad (1)$$

The arm will need to compensate ($A_c$) for the track movement (per unit length) to the extent of the displacement divided by its length, according to Equation 2.

$$A_c = D_t/L2 \quad (2)$$

Thus, the thermal coefficient of expansion for the scale ($T_s$) is then determined backward from the amount of compensation necessary, according to Equation 3.

$$T_s = A_c * L1 \quad (3)$$

The determination of the distance L1 and the thermal coefficient of the material ($T_s$) are normally performed in parallel. Several various plastic compounds are anticipated to provide good results for the scale material including polyester, polycarbonate, Mylar and other plastic compounds. In some cases, it is also helpful to use a scale that has the same thickness as the storage media in order to closely match the thermal expansion of the media.

Another technique is to use a given material for the scale and to employ a ratio between the distances L2 and L1 to determine a fixed ratio to compensate for the thermal expansion of the media. For example, if the media is Mylar and the scale is Mylar, and if the length L2 is 4 times that of length L1, then a fixed ratio of 0.25 can be employed to compensate for the expansion of the media. The computed expansion of the scale is reduced to 0.25 of its actual expansion to match that of the media expansion due to the length ratio (L2/L1=4).

Yet another technique is to select a portion of the scale material based on the ratio of length L2 to length L1. For example, if L2/L1=4 and the media is Mylar, then the scale can be formed from a section of Mylar (or other similarly expanding material) that is ¼ the size of the media. This provides that the expansion of the scale will cause a proportional adjustment in the photodetector signal to the processor and result in the proper adjustment of the head position.

Referring to FIGS. 2 through 4, the position encoder 20 is constructed from a plastic material that includes a sliding member 110 attached to the arm 14 and a stationary member 150. The sliding member 110 has an elongated portion 140 which contains an elongated groove 142 extending parallel to the direction 122 and into which extend a pair of photodiodes 144 and 146. The stationary member 150, also mounted in the encoder housing, has a recess 152 with a pair of light sensors or phototransistors 154 and 156 mounted therein in alignment with the respective LEDs 144 and 146. The elongated portion 140 has an outer wall 160 extending parallel to the direction 122, while the stationary member 150 contains a wall 162 extending parallel and adjacent the wall 160. In FIG. 3, specifically showing scale 21, gratings are created in the walls 160 and 162 for detecting scale movement by modulating light from the LEDs 144 and 146 to generate quadrature related signals from the phototransistors 154 and 156. Gratings in the walls 160 and 162 are formed by molded undulations in the outer surfaces of the walls which are formed from a transparent plastic material, such as polycarbonate. As shown in FIG. 3, these undulations include valleys 164, first inclined sloping side surfaces 166, hill top surfaces 168 and second inclined sloping side surfaces 170, with the surfaces 164, 166, 168 and 170 being elongated or running vertically. The dimensions of the surfaces 164, 166, 168 and 170 extending in the direction 122 are all equal, except for one valley surface 172 formed in the wall 162 of the stationary member 150 between the photosensors 154 and 156—this wall portion 172 has a dimension in the direction 122 which is one-half of the dimension of the surfaces 164, 166, 168 and 170 in the direction 122 to thus form two gratings, which are phase-shifted 90 degree(s) relative to each other, on the member 162. As an example, 80 gratings per inch are satisfactory to provide good encoder data, while up to 1100 or more gratings per inch can be constructed if extremely fine data is desired.

Light passing through the wall 160 from the LEDs 144 and 146 is internally reflected when it strikes one of the sloping surfaces 166 or 170, but passes through the valley and hilltop surfaces 164 and 168 which are parallel to the direction 122 and perpendicular to the direction of light emitted by the LEDs 144 and 146. Light that passes through the wall 160 and is emitted from the surfaces 164 and 168 is partially reflected and partially refracted if it strikes one of the sloping surfaces 166 or 170 of the wall 162, but passes through the wall 162 to the corresponding phototransistor 154 and 156 if the light impinges upon one of the valley surface 164 or hill top surface 168 of the stationary member wall 162. Due to the light reflection and refraction, movement of the wall 160 in the direction 122 causes the light impinging upon the light sensors 154 and 156 to be modulated. Since the surfaces 164, 166, 168 and 170 of the member 162 in line with the light sensor 154 from the LED 144 are 90 degree(s) out of phase relative to the corresponding surfaces of the wall 162 in front of the phototransistor 156, the signals generated by the sensors 154 and 156 by movement of the slide member 110 will be 90 degree(s) out of phase with each other. One complete cycle is defined by a valley surface 164 and a first sloping side surface 166 passing a point while a second complete cycle will occur when the succeeding hill top and second sloping surface pass the point. This construction is similar to a cursor control structure described in U.S. Pat. Nos. 4,782,327 and 4,935,7828, incorporated herein by reference.

Figure 5:
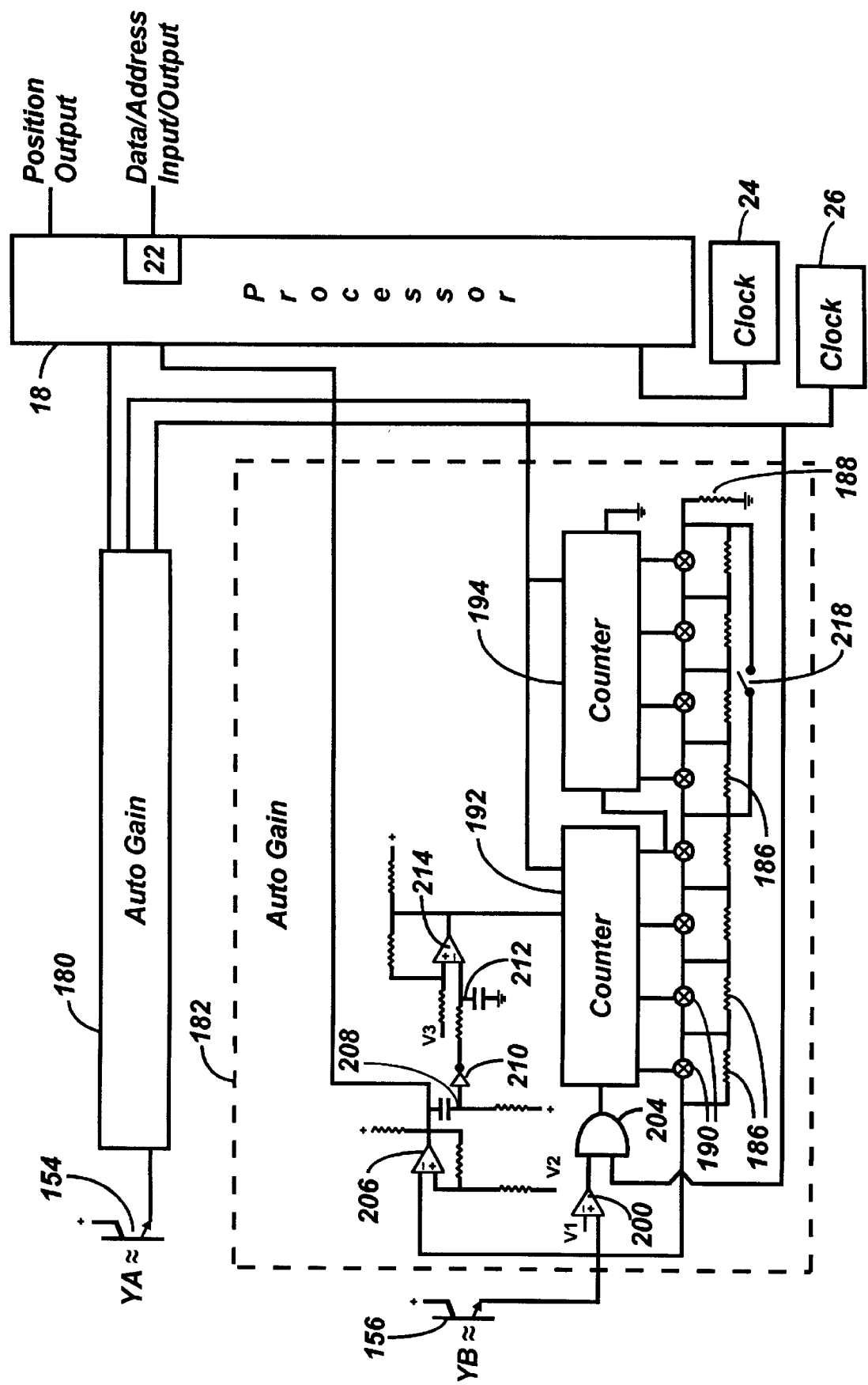
FIG. 5 is a block diagram of a processor according to an embodiment of the invention.

Referring to FIG. 5, the circuitry employed in the position encoder 20 is illustrated wherein the outputs of phototransistors 154 and 156 generate the respective phases A and B of the quadrature signals indicating movement of the scale. The signals from photodetectors 154 and 156 are delivered to auotogain circuits 180 and 182 respectively and to corresponding inputs to processor 18 such as type MC16C54 integrated computer from Microchips Technology. The invert terminal of the auto gain circuits is coupled to the LED emitter circuit to bias the auto gain circuits to properly detect scale motion and avoid false detection. Moreover, each of the auto gain circuits includes an amplifier and feedback resistor, as common in many amplifier circuits. The auto gain circuits deliver a pulsed signal to the processor when the scale is moved by the actuator.

Processor 18 receives the pulsed signals from the auto gain circuits and counts the number of pulses. This correlates to head motion and processor temporarily stores this information. The processor receives an input from a clock circuit 24 which has a frequency selected to read the inputs at a rate which exceeds the rate of generation during normal fast head movement, for example 12.5 kHz. One output of the processor is a position output that is used to control the actuator 16. Another output of the processor is through interface circuit 22 that drives output data to an external structure, for example a computer.

Figure 6:
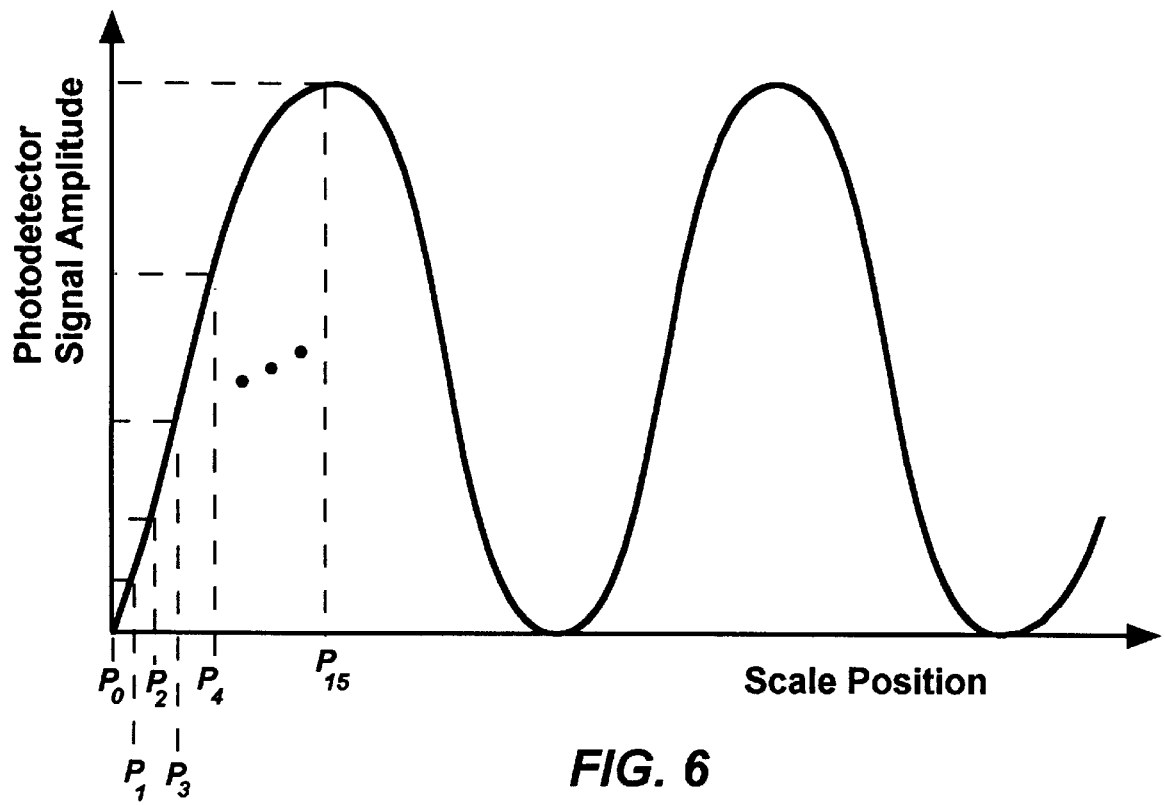
FIG. 6 depicts an amplitude of a photodetector signal with respect to scale position.
Figure 7:
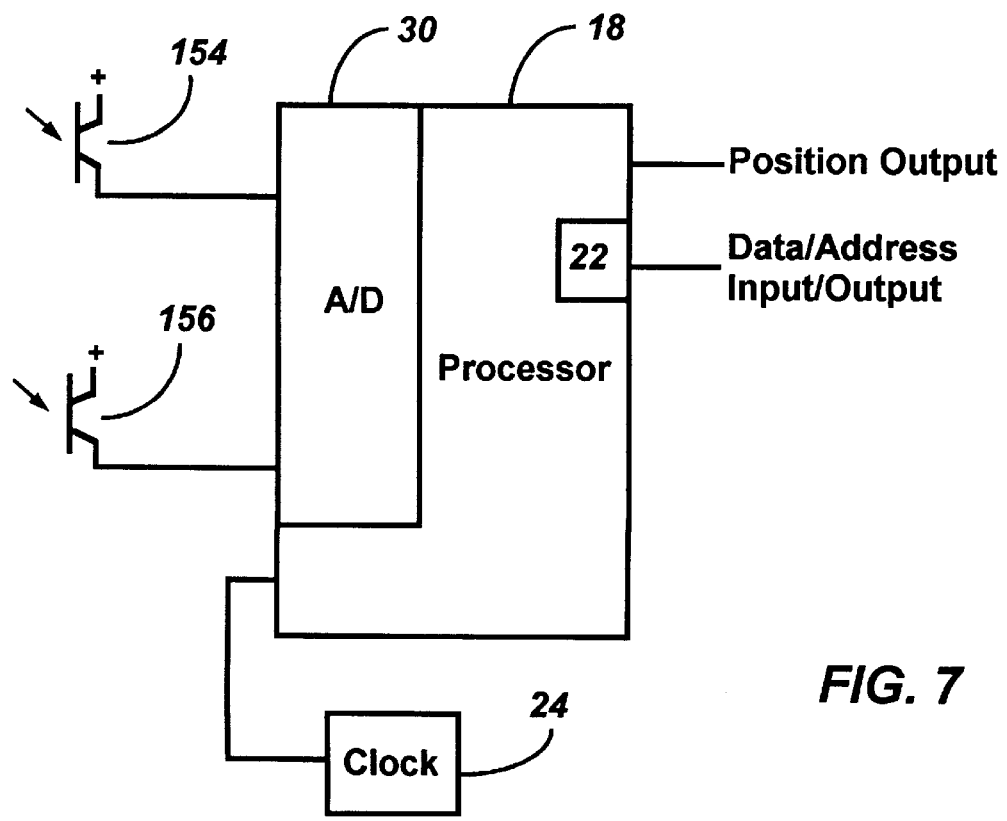
FIG. 7 is a block diagram of a processor according to an embodiment of the invention.

In another embodiment, depicted in FIGS. 6 and 7, the head position encoder employs a technique to generate very accurate position information. FIG. 6 depicts the amplitude of the photodetector signal with respect to scale position. As the slidable member 160 moves with respect to the stationary member 162, the light transmitted from the light sources 144, 146 to the photodetectors 154, 156 varies. This embodiment determines the amplitude of the photodetector signal by using an analog to digital (A/D) converter 30. The A/D converter can be a single converter or a dual converter. The A/D converter samples the photodetector signal at a rate of, for example, 12.5 kHz and provides a sampled digital signal for processing. In the exemplary embodiment, a 4-bit A/D encoder is described. On the X-axis of FIG. 6, there are 16 position indications $P_0$ through $P_{15}$. Each of these positions represents a different photodetector signal amplitude: position $P_0$ is 0000, position $P_1$ is 0001, position $P_2$ is 0010, position $P_3$ is 0011 and so on up to position $P_{15}$ which is 1111. In this manner, the position of the slidable member 160 can be provided very accurately in digital form. It is understood that a 4-bit A/D can provide 16 levels of resolution. If a higher resolution is desired, an 8-bit, 16-bit or greater number A/D converter can be used. In that case, the processor would be able to determine the scale position with even greater accuracy. This means that the processor 18 is capable of controlling the head position with a high degree of accuracy in order to position the head at a desired location. As a result, the tracks on the media can be placed very close together and the media is capable of storing more information than in prior art techniques.

Having disclosed exemplary embodiments and the best mode, modifications and variations may be made to the exemplary embodiments while remaining within the scope of the invention as defined by the following claims.

What is claimed is:

1. A disk drive head position encoder for use in a disk drive having a storage media, a head coupled to an arm having a fixed pivot point and an actuator configured to control a position of said head, comprising:

a scale coupled to said arm having gratings formed by undulations configured to distort light penetrating therethrough;

a light source configured to penetrate said scale and to direct light onto a photodetector, said photodetector configured to generate a photodetector signal in response to said light; and a processor coupled to said photodetector and said actuator and configured to determine a head position of said head on said storage media by processing said photodetector signal;

wherein said scale is constructed from a material having a coefficient of expansion similar to that of said storage media; and wherein said processor is configured to compensate for the movement of said head position by an amount equal to the ratio of an effective distance L1 of the scale from the pivot point to an effective distance L2 of the head from the pivot point.

2. The disk drive head position encoder of claim 1, wherein:

said scale is constructed from a material having a coefficient of thermal expansion similar to that of said storage media.

3. The disk drive head position encoder of claim 1, wherein:

said scale includes a stationary member formed by a molded transparent plastic material, and a slidable member formed by a molded transparent wall, said slidable member positioned to move in a path longitudinally along said stationary member.

4. The disk drive head position encoder of claim 3, wherein:

said stationary member has a transparent wall adjacent and parallel to said slidable member wall;

said slidable member wall has a grating defined by transverse molded undulations in one surface of the slidable member wall;

said stationary member has a pair of gratings defined by transverse molded undulations in one surface of the stationary member wall;

said light source is configured to generate a pair of light beams directed transversely through the wall and grating of the slidable member and through the wall and respective gratings of the stationary member; and a pair of light sensors is disposed on an opposite side of the stationary member and slidable member from said light source and is configured to detect light of the respective pair of light beams passing through the walls and gratings.

5. The disk drive head position encoder of claim 4, wherein:

each of said undulations on the slidable and stationary member walls are defined by a series of valleys, first inclined, hill top and second inclined surfaces wherein the valley and hill top surfaces are parallel to the direction of movement of the slidable member, and the first and second inclined surfaces extend at opposite equal angles selected to reflect and refract substantial portions of the light beams directed transversely to the walls, and where each of the valley, first inclined, hill top and second inclined surfaces extend equal distances in component directions parallel to the hilltop surfaces.

6. The disk drive head position encoder of claim 3, wherein:

said pair of gratings on said stationary member being positioned so that one of the gratings is phase shifted relative to the other grating so as to generate quadrature related signals from the pair of light sensors during movement of the slidable member.

7. The disk drive head position encoder of claim 1, wherein:

said processor includes an analog to digital convertor configured to convert said photodetector signal to a multi-bit digital signal representative of an amplitude of said photodetector signal; and said processor is configured to determine said head position based at least in part on said multi-bit digital signal.

8. The disk drive head position encoder of claim 7, wherein:

said scale includes a stationary member formed by a molded transparent plastic material, and a slidable member formed by a molded transparent wall, said slidable member positioned to move in a path longitudinally along said stationary member.

9. The disk drive head position encoder of claim 8, wherein:

said stationary member has a transparent wall adjacent and parallel to said slidable member wall;

said slidable wall member has a grating defined by transverse molded undulations in one surface of the slidable member wall;

said stationary member has a pair of gratings defined by transverse molded undulations in one surface of the stationary member wall;

said light source is configured to generate a pair of light beams directed transversely through the wall and grating of the slidable member and through the wall and respective gratings of the stationary member; and a pair of light sensors is disposed on an opposite side of the stationary member and slidable member from said light source and is configured to detect light of the respective pair of light beams passing through the walls and gratings.

10. The disk drive head position encoder of claim 9, wherein:

each of said undulations on the slidable and stationary member walls are defined by a series of valleys, first inclined, hill top and second inclined surfaces wherein the valley and hill top surfaces are parallel to the direction of movement of the slidable member, and the first and second inclined surfaces extend at opposite equal angles selected to reflect and refract substantial portions of the light beams directed transversely to the walls, and where each of the valley, first inclined, hill top and second inclined surfaces extend equal distances in component directions parallel to the hilltop surfaces.

11. The disk drive head position encoder of claim 8, wherein:

said pair of gratings on said stationary member being positioned so that one of the gratings is phase shifted relative to the other grating so as to generate quadrature related signals from the pair of light sensors during movement of the slidable member.

12. The disk drive head position encoder of claim 7, wherein:

said scale is constructed from a material having a coefficient of expansion similar to that of said storage media.

13. The disk drive head position encoder of claim 7, wherein:

said scale is constructed from a material having a coefficient of thermal expansion similar to that of said storage media.

14. A method of sensing a disk drive head position on a storage media using a scale formed by undulations and configured to distort light, comprising the steps of:

generating an optical signal and directing the optical signal through the scale;

receiving a distorted optical signal on a photodetector;

generating a photodetector signal in response to the distorted optical signal; and processing the photodetector signal to determine the head position; and wherein said processing step compensates for the movement of the head position by an amount equal to the ratio of an effective distance L1 of the scale from a pivot point to an effective distance L2 of the head from the pivot point.

15. The method of claim 14, where the scale is constructed from a material having a coefficient of thermal expansion similar to that of the storage media, and the method further comprises the step of:

compensating for an expansion of the storage media.

16. The method of claim 14, where the scale is constructed from a material having a coefficient of thermal expansion similar to that of the storage media, and the method further comprises the step of:

compensating for a thermal expansion of the storage media.

17. The method of claim 15, further comprising the step of:

sliding a portion of the scale to cause the distorted optical signal.

18. The method of claim 14, further comprising the step of:

converting the photodetector signal to a multi-bit digital signal representative of an amplitude of the photodetector signal; and wherein said processing step includes the step of processing the multi-bit digital signal to determine the head position.

19. The method of claim 15, further comprising the step of:

converting the photodetector signal to a multi-bit digital signal representative of an amplitude of the photodetector signal; and wherein said processing step includes the step of processing the multi-hit digital signal to determine the head position.

20. A disk drive head position encoder for use in a disk drive having a storage media, a head and an actuator configured to control a position of said head, comprising:

a scale coupled to said arm having gratings formed by undulations configured to distort light penetrating therethrough;

a light source configured to penetrate said scale and to direct light onto a photodetector, said photodetector configured to generate a photodetector signal in response to said light; and a processor coupled to said photodetector and said actuator and configured to determine a head position of said head on said storage media by processing said photodetector signal;

wherein said processor includes an analog to digital convertor configured to convert said photodetector signal to a multi-bit digital signal representative of an amplitude of said photodetector signal; and wherein said processor is configured to determine said head position based at least in part on said multi-bit digital signal.

21. The disk drive head position encoder of claim 20, wherein:

said scale includes a stationary member formed by a molded transparent plastic material, and a slidable member formed by a molded transparent wall, said slidable member positioned to move in a path longitudinally along said stationary member.

22. The disk drive head position encoder of claim 21, wherein:

said stationary member has a transparent wall adjacent and parallel to said slidable member wall;

said slidable wall member has a grating defined by transverse molded undulations in one surface of the slidable member wall;

said stationary member has a pair of gratings defined by transverse molded undulations in one surface of the stationary member wall;

said light source is configured to generate a pair of light beams directed transversely through the wall and grating of the slidable member and through the wall and respective gratings of the stationary member; and a pair of light sensors is disposed on an opposite side of the stationary member and slidable member from said light source and is configured to detect light of the respective pair of light beams passing through the walls and gratings.

23. The disk drive head position encoder of claim 22, wherein:

each of said undulations on the slidable and stationary member walls are defined by a series of valleys, first inclined, hill top and second inclined surfaces wherein the valley and hill top surfaces are parallel to the direction of movement of the slidable member, and the first and second inclined surfaces extend at opposite equal angles selected to reflect and refract substantial portions of the light beams directed transversely to the walls, and where each of the valley, first inclined, hill top and second inclined surfaces extend equal distances in component directions parallel to the hilltop surfaces.

24. The disk drive head position encoder of claim 21, wherein:

said pair of gratings on said stationary member being positioned so that one of the gratings is phase shifted relative to the other grating so as to generate quadrature related signals from the pair of light sensors during movement of the slidable member.

25. The disk drive head position encoder of claim 20, wherein:

said scale is constructed from a material having a coefficient of expansion similar to that of said storage media.

26. The disk drive head position encoder of claim 22, wherein:

said scale is constructed from a material having a coefficient of thermal expansion similar to that of said storage media.

27. A method of sensing a disk drive head position on a storage media using a scale formed by undulations and configured to distort light, comprising the steps of:

generating an optical signal and directing the optical signal through the scale;

receiving a distorted optical signal on a photodetector;

generating a photodetector signal in response to the distorted optical signal; and processing the photodetector signal to determine the head position, wherein;

said processing step includes converting the photodetector signal to a multi-bit digital signal representative of an amplitude of the photodetector signal; and said processing step includes the step of processing the multi-bit digital signal to determine the head position.

* * * * *